(12) United States Patent
Yew et al.

(10) Patent No.: US 8,367,248 B2
(45) Date of Patent: Feb. 5, 2013

(54) NEGATIVE ACTIVE MATERIAL FOR RECHARGEABLE LITHIUM BATTERY, METHOD OF PREPARING THEREOF, AND RECHARGEABLE LITHIUM BATTERY INCLUDING THE SAME

(75) Inventors: Kyoung-Han Yew, Suwon-si (KR); Nam-Soon Choi, Suwon-si (KR); Sung-Soo Kim, Suwon-si (KR); Su-Yeong Park, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 658 days.

(21) Appl. No.: 11/984,806

(22) Filed: Nov. 21, 2007

(65) Prior Publication Data

US 2008/0118840 A1    May 22, 2008

(30) Foreign Application Priority Data

Nov. 22, 2006    (KR) .................. 10-2006-0115864

(51) Int. Cl.
*H01M 4/48* (2010.01)
(52) U.S. Cl. ............. 429/231.5; 429/231.2; 429/231.95; 252/182.1
(58) Field of Classification Search ............ 429/47–347, 429/231.2, 231.5, 231.95; 252/182.1
See application file for complete search history.

(56) References Cited

U.S. PATENT DOCUMENTS

| | | | |
|---|---|---|---|
| 5,284,721 A | 2/1994 | Beard | |
| 5,378,560 A | 1/1995 | Tomiyama | |
| 5,478,671 A * | 12/1995 | Idota | ............... 429/221 |
| 5,506,075 A | 4/1996 | Iwasaki et al. | |
| 5,700,598 A | 12/1997 | Denis et al. | |
| 5,705,291 A * | 1/1998 | Amatucci et al. | ............. 429/137 |
| 5,795,679 A | 8/1998 | Kawakami et al. | |
| 6,071,489 A | 6/2000 | Sun et al. | |
| 6,210,834 B1 | 4/2001 | Kweon et al. | |
| 6,221,531 B1 | 4/2001 | Vaughey et al. | |
| 6,316,143 B1 | 11/2001 | Foster et al. | |
| 6,482,537 B1 * | 11/2002 | Strangman et al. | ........... 428/633 |
| 6,596,437 B2 | 7/2003 | Yoon et al. | |

(Continued)

FOREIGN PATENT DOCUMENTS

| CN | 1298556 | 6/2001 |
|---|---|---|
| CN | 1304187 | 7/2001 |

(Continued)

OTHER PUBLICATIONS

*Search Report* from the European Patent Office issued in Applicant's corresponding European Patent Application No. 07121189.0 dated Jun. 12, 2008.

(Continued)

*Primary Examiner* — Ula C Ruddock
*Assistant Examiner* — Amanda Barrow
(74) *Attorney, Agent, or Firm* — Robert E. Bushnell, Esq.

(57) ABSTRACT

A negative active material for a rechargeable lithium battery of the present invention includes a lithium-vanadium oxide core material being capable of performing reversible electrochemical oxidation and reduction, and an inorganic oxide coating layer disposed on the surface of the core material. The negative active material can improve stability at the interface between a negative electrode and an electrolyte, charge and discharge efficiency, and cycle-life, and can be applied along with all kinds of aqueous and non-aqueous binders.

17 Claims, 3 Drawing Sheets

U.S. PATENT DOCUMENTS

| | | | |
|---|---|---|---|
| 6,783,890 B2 * | 8/2004 | Kweon et al. | 429/218.1 |
| 6,986,968 B2 | 1/2006 | Hong et al. | |
| 2001/0019774 A1 * | 9/2001 | Suzuki et al. | 428/447 |
| 2001/0046628 A1 | 11/2001 | Oesten et al. | |
| 2002/0106560 A1 * | 8/2002 | Kolb et al. | 429/212 |
| 2003/0003362 A1 | 1/2003 | Leising et al. | |
| 2003/0031919 A1 | 2/2003 | Isozaki et al. | |
| 2003/0124431 A1 | 7/2003 | Hwang et al. | |
| 2003/0130114 A1 * | 7/2003 | Hampden-Smith et al. | 502/180 |
| 2003/0207178 A1 | 11/2003 | Hu et al. | |
| 2003/0211396 A1 | 11/2003 | Kobayashi et al. | |
| 2003/0215700 A1 | 11/2003 | Hosoda et al. | |
| 2004/0018431 A1 | 1/2004 | Gozdz et al. | |
| 2004/0029010 A1 | 2/2004 | Sada et al. | |
| 2004/0072073 A1 | 4/2004 | Okochi et al. | |
| 2004/0106040 A1 | 6/2004 | Fukuoka et al. | |
| 2004/0157133 A1 | 8/2004 | Kim et al. | |
| 2004/0191633 A1 * | 9/2004 | Johnson et al. | 429/246 |
| 2005/0042515 A1 | 2/2005 | Hwang et al. | |
| 2005/0079417 A1 | 4/2005 | Kim et al. | |
| 2005/0164090 A1 * | 7/2005 | Kim et al. | 429/232 |
| 2005/0191550 A1 * | 9/2005 | Satoh et al. | 429/217 |
| 2006/0088766 A1 * | 4/2006 | Kim et al. | 429/231.2 |
| 2006/0166098 A1 | 7/2006 | Tabuchi et al. | |
| 2006/0236528 A1 | 10/2006 | Xu et al. | |
| 2007/0099085 A1 | 5/2007 | Choi et al. | |
| 2007/0099086 A1 * | 5/2007 | Kang et al. | 429/231.95 |
| 2007/0166615 A1 * | 7/2007 | Takamuku et al. | 429/231.2 |
| 2007/0207384 A1 | 9/2007 | Nakura | |
| 2008/0118834 A1 | 5/2008 | Yew et al. | |
| 2008/0118840 A1 | 5/2008 | Yew et al. | |
| 2008/0118841 A1 * | 5/2008 | Kim et al. | 429/231.95 |
| 2008/0182171 A1 | 7/2008 | Maeda et al. | |
| 2008/0182172 A1 * | 7/2008 | Takamuku et al. | 429/231.5 |
| 2008/0241688 A1 * | 10/2008 | Tokita et al. | 429/220 |
| 2008/0254365 A1 * | 10/2008 | Kim et al. | 429/221 |
| 2008/0305397 A1 * | 12/2008 | Kobayashi et al. | 429/231.5 |
| 2009/0023070 A1 * | 1/2009 | Tokita et al. | 429/231.5 |
| 2009/0068566 A1 * | 3/2009 | Park et al. | 429/331 |
| 2010/0143800 A1 | 6/2010 | Sawada et al. | |

FOREIGN PATENT DOCUMENTS

| | | | |
|---|---|---|---|
| CN | 1339834 | | 3/2002 |
| CN | 1416600 | | 5/2003 |
| CN | 1417876 | | 5/2003 |
| CN | 1607687 | | 4/2005 |
| CN | 1624960 | | 6/2005 |
| CN | 200410061373.6 | * | 6/2005 |
| CN | 1783551 A | | 6/2006 |
| CN | 1992420 | | 7/2007 |
| EP | 1511101 | | 3/2005 |
| EP | 1708296 A1 | | 10/2006 |
| EP | 1801908 A1 | | 6/2007 |
| JP | 59-020971 | | 2/1984 |
| JP | 06-60867 | | 3/1994 |
| JP | 06-275265 | | 9/1994 |
| JP | 06-302320 | | 10/1994 |
| JP | 06-325791 | | 11/1994 |
| JP | 07-029600 | | 1/1995 |
| JP | 07-029608 | | 1/1995 |
| JP | 07014580 B1 | | 1/1995 |
| JP | 07-122298 | | 5/1995 |
| JP | 08-124568 | | 5/1996 |
| JP | 08-241707 | | 9/1996 |
| JP | 10-188977 | | 7/1998 |
| JP | 10-247497 | | 9/1998 |
| JP | 10-270018 | | 10/1998 |
| JP | 11-185753 | | 7/1999 |
| JP | 2000-058059 | | 2/2000 |
| JP | 2000/090916 | | 3/2000 |
| JP | 2000-299132 | | 10/2000 |
| JP | 2001006683 | | 1/2001 |
| JP | 2001/297796 A | | 10/2001 |
| JP | 2001/325950 | | 11/2001 |
| JP | 2002-216753 | | 8/2002 |
| JP | 2002-324551 A | | 11/2002 |
| JP | 2002-326818 | | 11/2002 |
| JP | 2002-343431 | | 11/2002 |
| JP | 2002-362923 | | 12/2002 |
| JP | 2002352801 | | 12/2002 |
| JP | 2003017053 | | 1/2003 |
| JP | 2003/068305 | | 3/2003 |
| JP | 2003-142096 | | 5/2003 |
| JP | 2003-208891 A | | 7/2003 |
| JP | 2004-139947 | | 5/2004 |
| JP | 2004-149391 | | 5/2004 |
| JP | 2004/327190 | | 11/2004 |
| JP | 2005/072008 | | 3/2005 |
| JP | 2005/135872 | | 5/2005 |
| JP | 2005-158604 | | 6/2005 |
| JP | 2005-216855 | | 8/2005 |
| JP | 2006-128115 | | 5/2006 |
| JP | 2007-173096 | | 7/2007 |
| KR | 10-2000-0060301 | | 10/2000 |
| KR | 2001/0090522 A | | 10/2001 |
| KR | 10-0331370 | | 8/2002 |
| KR | 2003/0021112 A | | 3/2003 |
| KR | 10-2003-0032220 A | | 4/2003 |
| KR | 2004/0082803 A | | 9/2004 |
| KR | 2005/0020185 A | | 3/2005 |
| KR | 10-0497251 | | 6/2005 |
| KR | 2005/0052268 A | | 6/2005 |
| KR | 10-2005-0077079 | | 8/2005 |
| KR | 2006-0028327 | | 3/2006 |
| KR | 10-0570649 | | 4/2006 |
| KR | 0570648 | | 4/2006 |
| KR | 10-2006-0041828 A | | 5/2006 |
| KR | 10-2006-0050745 A | | 5/2006 |
| KR | 2006/0095221 A | | 8/2006 |
| KR | 2007-0016431 | | 2/2007 |
| KR | 10-0759410 B1 | | 9/2007 |
| KR | 2007/0091938 A | | 9/2007 |
| WO | 95/02001 A1 | | 1/1995 |
| WO | 97/28569 A1 | | 8/1997 |
| WO | WO 02/61864 | * | 2/2002 |
| WO | WO 02/061864 A1 | * | 8/2002 |
| WO | 03038931 | | 5/2003 |
| WO | 03096449 A1 | | 11/2003 |
| WO | 2006/115681 A2 | | 11/2006 |
| WO | WO 2007/029933 | * | 3/2007 |

OTHER PUBLICATIONS

Transmitter letter and Chinese Office Action issued by Chinese Patent Office on Aug. 14, 2009 in the corresponding Chinese Patent Application No. 2007101693089.

Chinese Office Action issued on Oct. 13, 2010 in the Chinese Patent Application No. 200710169303.6 which corresponds to U.S. Appl. No. 11/984,807.

Occlude, Dictionary.com. Dictionary.com Unabridged. Random House, Inc. http://disctionary.reference.com/browse (accessed: Jul. 15, 2010).

Absorption, Dictionary.com. Dictionary.com Unabridged. Random House, Inc. http://disctionary.reference.com/browse (accessed: Jul. 15, 2010).

European Search Report issued on Feb. 27, 2008 in the European Patent Application No. 07121149.4 which corresponds to U.S. Appl. No. 11/984,807.

Oskam G, et al. "Sol-Gel Synthesis of Carbon/Silica Gel Electrodes for Lithium Intercalation" Electrochemical and Solid-State Letters, IEEE Service Center, Piscataway, NJ, US, vol. 2, No. 12, Dec. 1999, pp. 610-612, XP001101158.

Ng, et al., "Si-O Network Encapsulated Graphite-Silicon Mixtures as Negative Electrodes for Lithium-Ion Batteries", Journal of Power Sources, vol. 94, No. 1, Feb. 15, 2001, p. 63-67.

Aurbach, et al., "Behavior of Lithiated Graphite Electrodes comprising Silica Based Binder", Journal of Applied Elecrochemistry, vol. 28, No. 10, Oct. 1998, p. 1051-1059.

Chen, et al., "Improving the Performance of soft Carbon for Lithium-Ion Batteries", Electrochemical Acta, vol. 51, No. 19, May 20, 2006, p. 3890-3894.

Korean Notice of Decision to Grant a Patent issued on Aug. 29, 2009 in the Korean Patent Application No. 10-2007-0091028 which corresponds to U.S. Appl. No. 12/230,945.

European Search Report issued on Feb. 18, 2008 in the European Patent Application No. 07120913.4. which corresponds to U.S. Appl. No. 11/984,531.

Ohzuku, et al., "Zero-Strain Insertion Material of Li [Li1/3Ti5/3]o4 for Rechargeable Lithium Cells", Journal of the Electrochemical Society, Electrochemical Society. vol. 142, No. 5, May 1, 1995, p. 1431-1435.

Mi, et al., "Carbon-coated Li1.2Cr0.4O2 Cathode Material for Lithium-Ion Batteries", Electrochemical and Solid-State Letters, vol. 9, No. 7, May 4, 2006, p. A324-A327.

Hiroshi Yamamoto et al., "Anode Properties of Li1+xV1-xO2 for Lithium Secondary Batteries", Abstract of 3B05 of the 43rd Battery Symposium in Japan, pp. 332-333.

Chinese Office Action issued on Oct. 18, 2010 in the Chinese Patent Application No. 200710169731.9 which corresponds to U.S. Appl. No. 11/042,330.

Chinese Office Action issued on May 25, 2010 in the Chinese Patent Application No. 200710169731.9 which corresponds to U.S. Appl. No. 11/042,330 and Request for Entry of the Accompanying Office Action herewith.

Chinese Office Action issued on Aug. 21, 2009 in the Chinese Patent Application No. 2007101697319 which corresponds to U.S. Appl. No. 11/042,330.

Korean Office Action issued on May 31, 2010 in the Korean Patent Application No. 10-2008-0063918 which corresponds to U.S. Appl. No. 12/216,467 and Request for Entry of the Accompanying Office Action herewith.

Office Action issued on Mar. 24, 2008 in the U.S. Appl. No. 11/834,335.

Japanese Office Action issued on Aug. 31, 2010 for Japanese Patent Application No. 2007-175311.

Chinese Office Action issued on Aug. 28, 2009 in the Chinese Patent Application No. 200710152425.4 which corresponds to U.S. Appl. No. 12/135,078.

European Search Report issued on Nov. 13, 2006 in the European Patent Application No. 04090319.7.

European Search Report issued on Feb. 18, 2008 in the European Patent Application No. 07120913.4.

European Search Report issued on Jun. 2, 2008 in the European Patent Application No. 08100042.4.

European Search Report issued on Jun. 2, 2008 in the European Patent Application No. 07116182.2.

Kim, S., Synthesis and characteriztion of MN V2 O6 as a high capacity anode material for a lithium secondary battery, solid State Ionics vol. 139 (2001), pp. 57-65.

Andrukaitis, Study of Mex(VO3)2 vanadates,, (Me=Co, Ni, Mn, 1<x<2) for lithium rechargeable cells, Journal of Powers sources 81-82 (1999) pp. 651-655.

Van Landschoot, N., Citric acid-assisted synthesis and characterization of doped LiCoVo4, solid state Ionics, vol. 166, (2004), Science direct, pp. 307-316.

Sivashanmugam, A., Glycine-Assisted Sol-Gel combustion Synthesis and characterization of Aluminum-Doped LiNiVO4 for Use in Lithium-Ion Batteries, Journal of electrochemical Society, vol. 153, No. 3, (2006), pp. A497-A503, XP-002475390.

Huang, F., et al., A novel Li2Ag0.5V2O5 Composite film Cathode for all-solid-State Lithium Batteries, Electrochemistry Communications, vol. 5, (2003), pp. 262-266.

Office Action (Paper No. 20100713) issued on Jul. 21, 2010 in the U.S. Appl. No. 11/984,807.

Office Action (Paper No. 20100201) issued on Feb. 23, 2010 in the U.S. Appl. No. 11/984,807.

Office Action (Paper No. 20100609) issued on Jun. 25, 2010 in the U.S. Appl. No. 11/984,531.

Office Action (Paper No. 20100101) issued on Jan. 11, 2010 in the U.S. Appl. No. 11/984,531.

Office Action (Paper No. 20100503) issued on May 12, 2010 in the U.S. Appl. No. 11/042,330.

Office Action (Paper No. 20081204) issued on Dec. 12, 2008 in the U.S. Appl. No. 11/042,330.

Office Action (Paper No. 20100223) issued on Mar. 9, 2010 in the U.S. Appl. No. 12/216,467.

Office Action (Paper No. 20091026) issued on Nov. 16, 2009 in the U.S. Appl. No. 12/135,078.

Office Action (Paper No. 20100901) issued on Sep. 8, 2010 in the U.S. Appl. No. 11/590,980.

Japanese Office Action issued on Sep. 7, 2010 for Japanese Patent Application No. 2007-153122.

Office Action issued on Jul. 2, 2009 in the U.S. Appl. No. 11/937,462.

Office Action issued on May 13, 2009 in the U.S. Appl. No. 11/947,708.

Japanese Office Action issued by JPO, dated Mar. 29, 2011, corresponding to Japanese Patent Application No. 2007-303286, together with Request for Entry.

Office Action issued by the Patent Office of the People's Republic of China dated Sep. 21, 2010 for corresponding Chinese Patent Application No. 200710169308.9 with English translation.

Chinese Office Action issued by SIPO on Aug. 25, 2011 in connection with Chinese Patent Application No. 200710169308.9 and English translation attached herewith.

Chinese Office Action issued Apr. 25, 2012 in connection with Chinese Patent Application Serial No. 200710169308.9, which also claims Korean Patent Application Serial No. 10-2006-0115864 as its priority document.

* cited by examiner

NEGATIVE ACTIVE MATERIAL FOR RECHARGEABLE LITHIUM BATTERY, METHOD OF PREPARING THEREOF, AND RECHARGEABLE LITHIUM BATTERY INCLUDING THE SAME

CLAIM OF PRIORITY

This application makes reference to, incorporates the same herein, and claims all benefits accruing under 35 U.S.C. §119 from an application for NEGATIVE ACTIVE MATERIAL FOR RECHARGEABLE LITHIUM BATTERY, METHOD OF PREPARING THEREOF, AND RECHARGEABLE LITHIUM BATTERY COMPRISING THE SAME earlier filed in the Korean Intellectual Property Office on the 22 Nov. 2006 and there duly assigned Serial No. 10-2006-0115864.

BACKGROUND OF THE INVENTION

1. Field of the Invention

The present invention relates to a negative active material for a rechargeable lithium battery, a method of preparing the same, and a rechargeable lithium battery including the same. More particularly, the present invention relates to a negative active material for a rechargeable lithium battery that can improve stability at the interface between a negative electrode and an electrolyte, charge and discharge efficiency, and cycle-life, and can be applied along with many kinds of binders, a method of preparing the same, and a rechargeable lithium battery including the same.

2. Description of the Related Art

A lithium rechargeable battery has recently drawn attention as a power source for a small portable electronic device. It uses an organic electrolyte solution and thereby has a discharge voltage that is twice as high as a conventional battery that uses an alkali aqueous solution, and accordingly has a high energy density.

A negative active material for a lithium battery can reversibly receive and supply lithium ions while maintaining its structural and electrical properties. For the negative active material, a lithium metal, a lithium-containing alloy, or a carbon-based material, which has a chemical potential that is a similar level to lithium metal when lithium ions are intercalated/deintercalated, is usually used. A battery using lithium metal or a lithium alloy as a negative active material is called a lithium metal battery, and a battery using a carbon material is called a lithium ion battery.

A lithium metal battery using lithium metal or a lithium alloy for its negative electrode has a risk of explosion due to a battery short that may be caused by formation of dendrites. Hence, the lithium metal battery is being replaced by a lithium ion battery that uses a carbon material as its negative active material and does not have such a risk. The lithium ion battery only transfers lithium ions during charge/discharge, and it maintains the electrode active material as it is. Thus, the lithium ion battery has improved stability and cycle-life.

In the lithium ion battery, a non-aqueous system in which polyvinylidene fluoride (PVDF) is dissolved in N-methyl-2-pyrrolidone (NMP) or an organic acetone solvent is usually used. The non-aqueous system is widely known as a binder for a conventional negative electrode plate. However, when the PVDF/NMP non-aqueous system is used as a binder, the organic solvent such as NMP and acetone may contaminate the natural environment. Also, since the organic solvent is expensive, the manufacturing cost for a lithium battery is increased. In addition, since most organic solvents are highly volatile, there is a risk of explosion when they are used in an enclosed space. To prevent explosions, an anti-explosion unit is additionally required.

To overcome the problems, researchers have actively studied to develop a method of using an aqueous system in which styrene-butadiene rubber (SBR) is dispersed in water along with a thickener, e.g., carboxylmethylcellulose (CMC), when a negative electrode plate is manufactured. Since the SBR binder can be dispersed in water in the form of emulsion, it does not have to use an organic solvent, and the SBR binder has strong adherence. With the SBR binder, the amount of a binder is reduced and the amount of a negative active material is increased, which is advantageous in manufacturing a high-capacity lithium battery.

When an aqueous solvent is used with an aqueous binder, the high surface tension of the aqueous solvent degrades the coating property of negative active material slurry to thereby reduce the planarity of a negative electrode. The low planarity of the negative electrode makes the surface of the negative electrode non-uniform to thereby reduce a reaction surface area and deteriorate the cycle-life characteristic.

SUMMARY OF THE INVENTION

One embodiment of the present invention provides a negative active material for a rechargeable lithium battery that can improve stability at the interface between a negative electrode and an electrolyte, charge and discharge efficiency, and cycle-life, and can be applied along with all kinds of aqueous and non-aqueous binders, and a method of preparing the negative active material.

Another embodiment of the present invention provides a rechargeable, lithium battery including the negative active material and having excellent charge and discharge efficiency and cycle-life.

According to one embodiment of the present invention, provided is a negative active material for a rechargeable lithium battery that includes a lithium-vanadium oxide core being capable of performing reversible electrochemical oxidation and reduction, and an inorganic oxide coating layer disposed on the surface of the core material.

The lithium-vanadium oxide is represented by Chemical Formula I.

$$Li_xM_yV_zO_{2+d}$$ 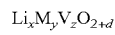 Chemical Formula I wherein $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

The inorganic oxide is selected from the group consisting of silica, alumina, zirconia, titania, and mixtures thereof.

The inorganic oxide has a nano-sized particle having a diameter of 50 nm or less. According to one embodiment, the inorganic oxide has a nano-sized particle having a diameter of 30 nm or less. According to another embodiment, the inorganic oxide has a nano-sized particle having a diameter of 5 nm to 20 nm.

The inorganic oxide coating layer has a thickness of 50 nm or less. According to one embodiment, the inorganic oxide coating layer has a thickness of 30 nm or less. According to another embodiment, the inorganic oxide coating layer has a thickness of 5 nm to 20 nm.

The inorganic oxide is presented in an amount of 1 to 30 parts by weight based on 100 parts by weight of the core material. According to one embodiment, the inorganic oxide is presented in an amount of 1 to 10 parts by weight based on 100 parts by weight of the core material. The inorganic oxide may be coated in an amount of 5 parts by weight or 7 parts by weight based on 100 parts by weight of the core material.

According to another embodiment of the present invention, provided is a method of a negative active material for a rechargeable lithium battery that includes steps of preparing a dispersion solution by dispersing lithium-vanadium oxide in a coating liquid including inorganic oxide and a solvent, volatilizing the solvent from the dispersion solution, and heat-treating the solvent-volatilized dispersion solution. The lithium-vanadium oxide is formed into a core.

According to yet another embodiment of the present invention, provided is a rechargeable lithium battery that includes a negative electrode including the negative active material, a positive electrode including a positive active material, and an electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
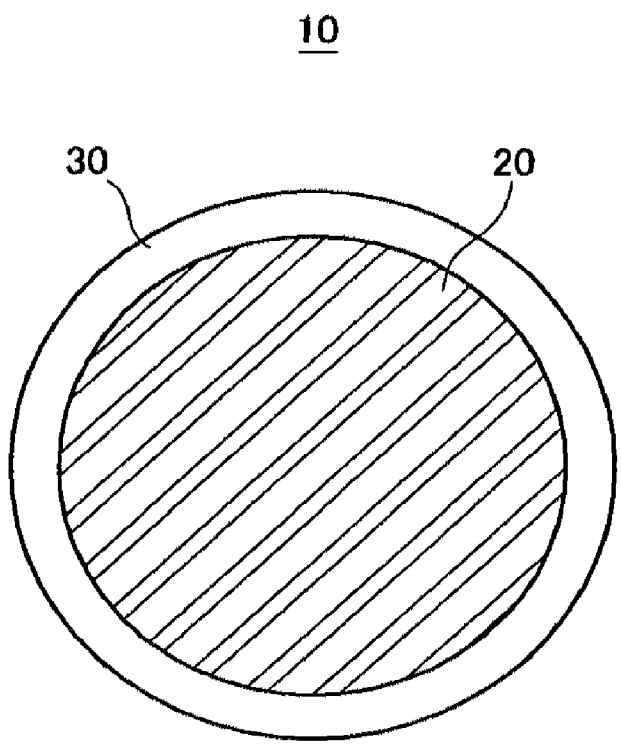
FIG. 1 schematically shows a negative active material for a rechargeable lithium battery constructed as one embodiment of the present invention.

The present invention relates to a negative active material for a rechargeable lithium battery that has a core-shell structure.

The core is made of lithium-vanadium oxide that is capable of performing reversible electrochemical oxidation and reduction, and is a compound represented by the following Chemical Formula 1.

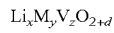

$$Li_xM_yV_zO_{2+d}$$ Chemical Formula 1 wherein, in the above Chemical Formula 1, $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

The shell (coating layer) on the surface of the core includes oxide including an element selected from the group consisting of Si, Ti, Zr, Al, and combinations thereof, or mixtures thereof.

The oxide includes an inorganic oxide that is selected from the group consisting of silica, alumina, zirconia, titania, and mixtures thereof.

The inorganic oxide is present in an amount of 1 to 30 parts by weight based on 100 parts by weight of the core material. According to one embodiment, the inorganic oxide is presented in an amount of 1 to 10 parts by weight based on 100 parts by weight of the core material. The inorganic oxide may be coated in an amount of 5 parts by weight or 7 parts by weight based on 100 parts by weight of the core material. If the amount of the inorganic oxide is less than 1 part by weight, the coating effect is negligible. If the amount of the inorganic oxide is more than 30 parts by weight, a thick coating layer may be formed on the surface of the core resulting in an increase of electrode resistance.

The inorganic oxide has a nano-sized particle having a diameter of 50 nm or less. According to one embodiment, the inorganic oxide has a nano-sized particle with a diameter of 30 nm or less. According to another embodiment, the inorganic oxide has a nano-sized particle with a diameter of 5 nm to 20 nm. If the particle size of the inorganic oxide exceeds 50 nm, coating property on the core deteriorates. Conversely, if the particle size is smaller than 5 nm, the inorganic oxide may coagulate with each other, or dispersion property is poor when coating is carried out. Thus, it is hard to form a uniform coating layer.

The inorganic oxide coating layer has a nano-sized thickness that can conducts lithium ions, and does not incur resistance. According to one embodiment, the inorganic oxide coating layer has a thickness of 50 nm or less. According to another embodiment, the inorganic oxide coating layer has a thickness of 30 nm or less. According to yet another embodiment, the inorganic oxide coating layer has a thickness of 5 nm to 20 nm. If the coating layer is thicker than 50 nm, the coating layer functions as a barrier that reduces an electron transfer rate into the surface of an active material that forms the core and reduces a lithium ion transfer rate into the inside of the active material. Eventually, the coating layer considerably degrades the electro-chemical characteristics of the active material, such as the high-efficiency characteristic and cycle-life characteristic. Thus, it is not desirable. Conversely, if the coating layer is thinner than 5 nm, the aforementioned effect cannot be acquired.

The structure of the active material is shown in FIG. 1. As shown in FIG. 1, active material 10 includes a core-shell structure including core 20 and coating layer (shell) 30 disposed on core 20.

An SEI (solid electrolyte interface) film is formed by electrochemical decomposition of an electrolyte at the interface between an electrolyte and a negative active material in a conventional battery system. According to one embodiment of the present invention, the inorganic oxide coating layer, which is disposed on the surface of the core, minimizes the formation of the SEI film during charging and discharging processes, and thereby improves reversible efficiency and cycle-life.

The negative active material having the above structure may be used in a mixture with a lithium metal, a lithium-containing alloy, a material that is capable of reversibly intercalating and deintercalating lithium ions, or a material that is capable of reversibly forming a lithium-containing compound by reacting lithium ions.

The material being capable of reversibly intercalating and deintercalating lithium ions may be a carbon-based negative active material such as crystalline carbon, amorphous carbon, or combinations thereof.

The material being capable of reversibly forming a lithium-containing compound by reacting with lithium ions may include Si, Si oxide, Sn, Sn oxide, a tin alloy composite, a transition element oxide, a lithium metal nitride, or lithium-vanadium oxide that is not coated with an inorganic oxide.

The lithium-containing alloy may be an alloy of lithium and a metal selected from the group consisting of Na, K, Rb, Cs, Fr, Be, Mg, Ca, Sr, Ba, Ra, Al, Fe, and Sn.

The negative active material developed as one embodiment of the present invention is prepared as follows.

First, a dispersion solution is prepared by dispersing lithium-vanadium oxide in a coating liquid in which nano-sized inorganic oxide particles are dispersed. Since the nano-sized inorganic oxide particles have a high surface energy, they are adsorbed onto the surface of a core material that exists in a form of large particle to maintain stability.

The inorganic oxide is presented in an amount of 1 to 30 parts by weight based on 100 parts by weight of the core material. According to one embodiment, the inorganic oxide is present in an amount of 1 to 10 parts by weight based on 100 parts by weight of the core material. According to another embodiment, the inorganic oxide is present in an amount of 5 parts by weight or 7 parts by weight based on 100 parts by weight of the core material. When the amount of the inorganic oxide is less than 1 part by weight, coating effect is negligible, whereas when it is more than 30 parts by weight, a thick coating layer may be formed on the surface of the core resulting in increase of electrode resistance.

The core material is used in an amount of 1 to 10 g per 1000 ml of a solvent.

Herein, the solvent of the dispersion solution may include a material selected from the group consisting of water, methanol, ethanol, propanol, and mixtures thereof.

Subsequently, the solvent is volatilized from the prepared dispersion solution, and then heat treatment is performed to obtain lithium-vanadium oxide coated with an inorganic oxide.

The process of volatilizing the solvent may be performed by heating the dispersion solution at temperature ranging from 50° C. to 100° C., and more specifically at around 60° C. The volatilization temperature may vary according to the kind of alcohol used for a solvent of the dispersion solution. If the volatilization is performed at temperature lower than 50° C., the volatilization time becomes longer. If it is performed at temperature higher than 100° C., there is no big difference in the effect. Thus, it is uneconomical.

The heat treatment may be performed at temperature ranging from 300° C. to 600° C. When the heat treatment is performed at lower than 300° C., impurities exist in the core material. When it is performed at higher than 600° C., the process is uneconomical.

In addition, additives such as a dispersing agent and a surfactant may be added to the dispersion solution to help dispersion of the lithium-vanadium oxide. The additives stabilize the surface of the nano-sized inorganic oxide. Since the inorganic oxide with a stabilized surface cannot be adsorbed onto the lithium-vanadium oxide, the additives should be used by an amount that the additives do not inhibit the adsorption. The kinds and amount of the additives are widely known to those skilled in the art to which the present invention pertains.

The rechargeable lithium battery includes a negative electrode including the negative active material described above, a positive electrode, and an electrolyte.

The negative electrode includes a current collector and a negative active material layer disposed on the current collector. The negative active material layer is made of a material that includes the negative active material described above.

The negative electrode may be fabricated as follows. A composition, including the negative active material of the present invention, a binder, and optionally a conductive agent mixed in a solvent, is applied on a negative current collector made of a material such as copper.

The negative active material of the present invention is the same as above-described. According to one embodiment of the present invention, the negative active material is included in an amount of 50 wt % to 99 wt % based on the total weight of the negative active material layer. According to another embodiment, the negative active material is included in an amount of 80 wt % to 98 wt % based on the total weight of the negative active material layer. When the amount of the negative active material is less than 50 wt %, battery capacity may decreases, whereas when it is more than 99 wt %, a relative amount of a binder is reduced and thus binding force between the negative active material layer and a current collector may decreases.

The amount of the binder ranges from 0.8 wt % to 5 wt % based on the total weight of the negative active material layer. According to one embodiment, the amount of the binder ranges from 1 wt % to 5 wt %. According to another embodiment, the amount of the binder ranges from 1 wt % to 2 wt %. When the amount of the binder is less than 0.8 wt %, binder content is significantly low and adherence between a negative active material and a current collector is not sufficient. On the contrary, when it is more than 5 wt %, the amount of the negative active material is low and thus a high-capacity battery cannot be realized.

Herein, aqueous or non-aqueous binders may be used.

For the aqueous binder, at least one selected from the group consisting of a styrene-butadiene rubber (SBR), polyvinyl alcohol, carboxymethyl cellulose, hydroxypropyl cellulose, diacetyl cellulose, and mixtures thereof may be used. Since the styrene-butadiene rubber binder can be dispersed in water in the form of an emulsion, it does not have to use an organic solvent. Also, since it is highly adhesive, the amount of the binder to be used can be reduced and the amount of the negative active material can be increased. Therefore, it is advantageous in the manufacture of a high-capacity lithium battery. The aqueous binder is used together with water or an aqueous solvent of water and an alcohol solvent.

When an aqueous binder is used, a thickener may be added thereto to adjust the thickness. The thickener may be at least one selected from the group consisting of carboxyl methyl cellulose, hydroxymethyl cellulose, hydroxy ethyl cellulose, hydroxy propyl cellulose, and combinations thereof. The amount of the thickener may range from 0.8 wt % to 5 wt % based on the entire negative active material layer, specifically from 1 wt % to 5 wt %, and more specifically from 1 wt % to 2 wt %.

If the amount of the thickener is less than 0.8 wt %, there may be a problem that the negative active material may be too fluid and flows down during a coating process of the negative active material. If the amount of the thickener is more than 5 wt %, the negative active material becomes too thick for coating and functions as a resistor. Also, since the amount of the negative active material is reduced as much as an excessive amount of the thickener, there is a problem that the produced battery does not have high capacity.

Examples of the non-aqueous binder include at least one selected from the group consisting of polyvinylchloride, polyvinylpyrrolidone, polytetrafluoroethylene, polyvinylidene fluoride, polyethylene, polypropylene, and mixtures thereof. These binders are used along with non-aqueous solvents such as N-methyl-2-pyrrolidone (NMP), dimethylformamide, tetrahydrofuran, and mixtures thereof.

Any electrically conductive material may be used as a conductive agent unless it causes a chemical reaction. Examples of the conductive agent include natural graphite, artificial graphite, carbon black, acetylene black, ketjen black, carbon fiber, a metal powder or a metal fiber including copper, nickel, aluminum, silver, and so on, a polyphenylene derivative, or combinations thereof.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a positive active material that is capable of performing a reversible electrochemical oxidation and reduction reaction, and is a lithiated intercalation compound that is used in a rechargeable lithium battery. The lithiated intercalation compound includes compounds of the following Chemical Formulas 2 to 25.

$$Li_aA_{1-b}B_bD_2 \quad \text{Chemical Formula 2}$$

wherein, in the Formula 2, $0.95 \leq a \leq 1.1$, and $0 \leq b \leq 0.5$.

$$Li_aE_{1-b}B_bO_{2-c}F_c \quad \text{Chemical Formula 3}$$

wherein, in the above Formula 3, $0.95 \leq a \leq 1.1$, $0 \leq b \leq 0.5$, and $0 \leq c \leq 0.05$.

$$LiE_{2-b}B_bO_{4-c}F_c \quad \text{Chemical Formula 4}$$

wherein, in the above Formula 4, $0 \leq b \leq 0.5$, and $0 \leq c \leq 0.05$.

$$Li_aNi_{1-b-c}Co_bB_cD_\alpha \quad \text{Chemical Formula 5}$$

wherein, in the above Formula 5, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_\alpha \quad \text{Chemical Formula 6}$$

wherein, in the above Formula 6, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \quad \text{Chemical Formula 7}$$

wherein, in the above Formula 7, $0.95 \leq a \leq 1.1$, $0 \leq b \leq 0.5$, $0 \leq c \leq 0.05$, and $0 < \alpha < 2$.

$$Li_aN_{1-b-c}Mn_bB_cD_\alpha \quad \text{Chemical Formula 8}$$

wherein, in the above Formula 8, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_\alpha \quad \text{Chemical Formula 9}$$

wherein, in the above Formula 9, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2 \quad \text{Chemical Formula 10}$$

wherein, in the above Formula 10, $0.95 \leq a \leq 1.1$, $0 \leq b \leq 0.5$, $0 \leq c \leq 0.05$, and $0 < \alpha < 2$.

$$Li_aNi_bE_cG_dO_2 \quad \text{Chemical Formula 11}$$

wherein, in the above Formula 11, $0.90 \leq a \leq 1.1$, $0 \leq b \leq 0.9$, $0 \leq c \leq 0.5$, and $0.001 \leq d \leq 0.1$.

$$Li_aNi_bCo_cMn_dGeO_2 \quad \text{Chemical Formula 12}$$

wherein, in the above Formula 12, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \quad \text{Chemical Formula 13}$$

wherein, in the above Formula 13, $0.90 \leq a \leq 1.1$, and $0.001 \leq b \leq 0.1$.

$$Li_aCoG_bO_2 \quad \text{Chemical Formula 14}$$

wherein, in the above Formula 14, $0.90 \leq a \leq 1.1$, and $0.001 \leq b \leq 0.1$.

$$Li_aMnG_bO_2 \quad \text{Chemical Formula 15}$$

wherein, in the above Formula 15, $0.90 \leq a \leq 1.1$, and $0.001 \leq b \leq 0.1$.

$$Li_aMn_2G_bO_4 \quad \text{Chemical Formula 16}$$

wherein, in the above Formula 16, $0.90 \leq a \leq 1.1$, and $0.001 \leq b \leq 0.1$.

$$QO_2 \quad \text{Chemical Formula 17}$$

$$QS_2 \quad \text{Chemical Formula 18}$$

$$LiQS_2 \quad \text{Chemical Formula 19}$$

$$V_2O_5 \quad \text{Chemical Formula 20}$$

$$LiV_2O_5 \quad \text{Chemical Formula 21}$$

$$LiIO_2 \quad \text{Chemical Formula 22}$$

$$LiNiVO_4 \quad \text{Chemical Formula 23}$$

$$Li_{3-f}J_2(PO_4)_3 \ (0 \leq f \leq 3) \quad \text{Chemical Formula 24}$$

$$Li_{3-f}Fe_2(PO_4)_3 \ (0 \leq f \leq 2) \quad \text{Chemical Formula 25}$$

In the above Formulas 2 to 25, "A" is selected from the group consisting of Ni, Co, Mn, and combinations thereof. "B" is selected from the group consisting of Al, Ni, Co, Mn, Cr, Fe, Mg, Sr, V, a rare earth element, and combinations thereof. "D" is selected from the group consisting of O, F, S, P, and combinations thereof. "E" is selected from the group consisting of Co, Mn, and combinations thereof. "F" is selected from the group consisting of F, S, P, and combinations thereof. "G" is selected from the group consisting of Al, Cr, Mn, Fe, Mg, La, Ce, Sr, V, a lanthanide element, and combinations thereof. "Q" is selected from the group consisting of Ti, Mo, Mn, and combinations thereof. "I" is selected from the group consisting of Cr, V, Fe, Sc, Y, and combinations thereof. "J" is selected from the group consisting of V, Cr, Mn, Co, Ni, Cu, and combinations thereof.

The electrolyte includes a non-aqueous organic solvent and a lithium salt.

The lithium salt is dissolved in the non-aqueous organic solvent to supply lithium ions in the battery. It may operate a basic operation of a rechargeable lithium battery, and it facilitates transmission of lithium ions between positive and negative electrodes. Non-limiting examples of the lithium salt include at least one supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and lithium bisoxalate borate. The lithium salt may be used at a 0.1M to 2.0M concentration. When the lithium salt concentration is less than 0.1M, electrolyte performance may deteriorate due to low electrolyte conductivity, whereas when it is more than 2.0M, lithium ion mobility may be reduced due to an increase of electrolyte viscosity.

The non-aqueous organic solvent acts as a medium for transmitting ions taking part in the electrochemical reaction of the battery. The non-aqueous organic solvent may include, but is not limited to, benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R is a C2 to C50 linear, branched, or cyclic hydrocarbon, a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, ethylpropyl carbonate, methyl propionate, ethyl propionate, methyl acetate, ethyl acetate, propyl acetate, dimethoxyethane, 1,3-dioxolan, diglyme, tetraglyme, ethylene carbonate, propylene carbonate, γ-butyrolactone, sulfolane, valerolactone, decanolide, and mevalolactone. The non-aqueous organic solvent may be used singularly or in a mixture. When the organic solvent is used in a mixture, a mixing ratio can be controlled in accordance with a desirable cell performance.

Figure 2:
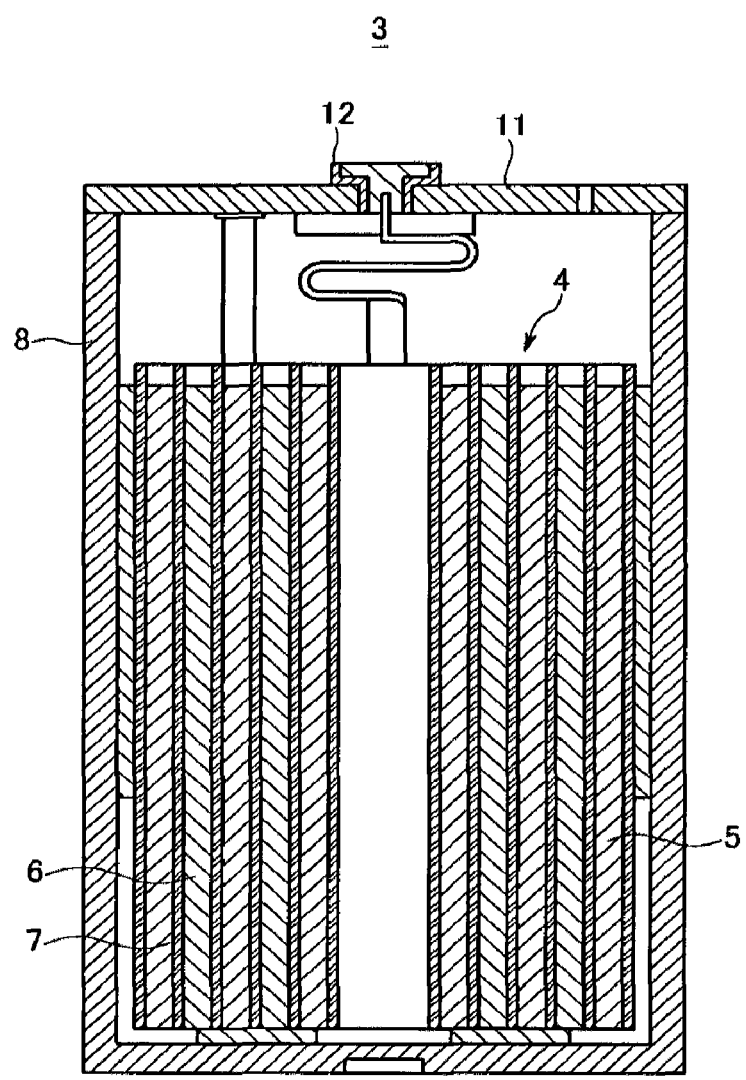
FIG. 2 schematically shows a rechargeable lithium battery using the negative active material, which is constructed as one embodiment of the present invention.

FIG. 2 shows a rechargeable lithium battery having the above-mentioned structure constructed as an embodiment of the present invention.

Referring to FIG. 2, rechargeable lithium battery 3 is composed of electrode assembly 4 including positive electrode 5, negative electrode 6, and separator 7 interposed between positive electrode 5 and negative electrode 6, all of which are positioned in battery case 8. The upper part of battery case 8 is sealed with cap plate 11 and gasket 12. The rechargeable lithium battery of the present embodiment is not limited to the above-mentioned shape, and may have a prismatic shape, a pouch, or so on.

The rechargeable lithium battery generally includes a positive electrode, a negative electrode, and an electrolyte. The battery may further include a separator as needed. The separator may include any material used in conventional lithium secondary batteries. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene three-layered separator, and a polypropylene/polyethylene/polypropylene three-layered separator.

The following examples illustrate the present invention in more detail. However, it is understood that the present invention is not limited by these examples.

Example 1

A coating liquid was prepared by dispersing silica with an average particle diameter of 12 nm in ethanol and performing ultrasonic wave treatment thereon for one hour.

A dispersion solution was prepared by dispersing $Li_{1.1}Ti_{0.1}V_{0.9}O_2$ in the coating liquid. Herein, one part by weight of silica was used based on 100 parts by weight of $Li_{1.1}Ti_{0.1}V_{0.9}O_2$. The dispersion solution was heated at 60° C. to volatilize ethanol. Then, a negative active material with a silica coating layer formed on the surface of $Li_{1.1}Ti_{0.1}V_{0.9}O_2$ in a thickness of 20 nm was prepared by performing heat treatment at 450° C.

Example 2

A negative active material was prepared according to the same method as described in Example 1, except that a silica coating layer was formed in a thickness of 22 nm, 3 parts by weight of silica was used based on 100 parts by weight of $Li_{1.1}Ti_{0.1}V_{0.9}O_2$, and an average particle diameter of the silica was 10 nm.

Example 3

A coating liquid was prepared by dispersing alumina, which has an average particle diameter of 12 nm, in ethanol and performing ultrasonic wave treatment thereon for one hour.

A dispersion solution was prepared by dispersing $Li_{1.1}Ti_{0.1}V_{0.9}O_2$ in the coating liquid. Herein, one part by weight of alumina was used based on 100 parts by weight of $Li_{1.1}Ti_{0.1}V_{0.9}O_2$. The dispersion solution was heated at 60° C. to volatilize ethanol. Then, a negative active material with an alumina coating layer formed on the surface of $Li_{1.1}Ti_{0.1}V_{0.9}O_2$ in a thickness of 24 nm was prepared by performing heat treatment at 450° C.

Example 4

A negative active material was prepared according to the same method as described in Example 3, except that an alumina coating layer was formed in a thickness of 35 nm by using 7 parts by weight of alumina, which has an average particle diameter of 15 nm, based on 100 parts by weight of $Li_{1.1}Ti_{0.1}V_{0.9}O_2$.

Example 5

A coating liquid was prepared by dispersing zirconia with an average particle diameter of 10 nm in propanol and performing ultrasonic wave treatment thereon for one hour.

A dispersion solution was prepared by dispersing $Li_{1.1}Ti_{0.1}V_{0.9}O_2$ in the coating liquid. Herein, five parts by weight of zirconia was used based on 100 parts by weight of $Li_{1.1}Ti_{0.1}V_{0.9}O_2$. The dispersion solution was heated at 80° C. to volatilize propanol. Then, a negative active material with a zirconia coating layer formed on the surface of $Li_{1.1}Ti_{0.1}V_{0.9}O_2$ in a thickness of 25 nm was prepared by performing heat treatment at 450° C.

Example 6

A negative active material was prepared according to the same method as described in Example 5, except that a zirconia coating layer was formed in a thickness of 24 nm by using 3 parts by weight of zirconia, which has an average particle diameter of 15 nm, based on 100 parts by weight of $Li_{1.1}Ti_{0.1}V_{0.9}O_2$.

Example 7

A coating liquid was prepared by dispersing titania with an average particle diameter of 7 nm in ethanol and performing ultrasonic wave treatment thereon for one hour.

A dispersion solution was prepared by dispersing $Li_{1.1}Ti_{0.1}V_{0.9}O_2$ in the coating liquid. Herein, 15 parts by weight of titania was used based on 100 parts by weight of $Li_{1.1}Ti_{0.1}V_{0.9}O_2$. The dispersion solution was heated at 80° C. to volatilize ethanol. Then, a negative active material with a titania coating layer formed on the surface of $Li_{1.1}Ti_{0.1}V_{0.9}O_2$ in a thickness of 34 nm was prepared by performing heat treatment at 450° C.

Example 8

A negative active material was prepared according to the same method as described in Example 7, except that a titania coating layer was formed in a thickness of 45 nm by using 15 parts by weight of titania, which has an average particle diameter of 15 nm, based on 100 parts by weight of $Li_{1.1}Ti_{0.1}V_{0.9}O_2$.

Comparative Example 1

$Li_{1.1}Ti_{0.1}V_{0.9}O_2$ not coated with silica nano-particles was used in a negative active material instead of nano-particle coated $Li_{1.1}Ti_{0.1}V_{0.9}O_2$ as described in Example 1 to 8.

Experimental Example 1

Figure 3:
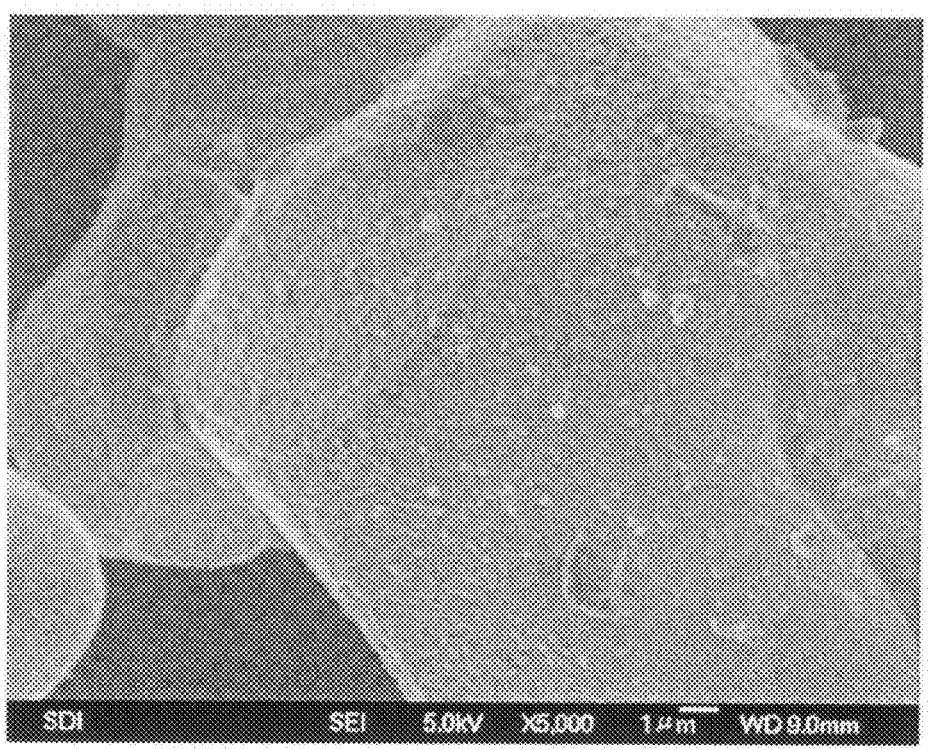
FIG. 3 is a scanning electron microscope photograph of a negative active material prepared according to the principles of the present invention.

The negative active material prepared according to Example 1 was observed with a scanning electron microscope (SEM), and a photograph thereof is presented in FIG. 3.

FIG. 3 shows a SEM photograph of the negative active material prepared according to Example 1. Referring to FIG. 3, the surface of $Li_{1.1}Ti_{0.1}V_{0.9}O_2$ was coated with silica after heat treatment.

Manufacturing of Battery

A mixture was prepared by mixing a positive active material, e.g., lithium cobalt oxide ($LiCoO_2$) with a conductive agent, e.g., carbon black. A binder liquid was prepared by dissolving a polyvinylidenefluoride binder in an N-methyl-2-pyrrolidone solvent, and positive active material slurry was prepared by adding the mixture to the binder liquid.

The positive active material slurry was applied to aluminum foil having a thickness of 20 μm by using a doctor blade method. A positive electrode was prepared by drying the aluminum foil coated with the positive active material slurry at 120° C. for 10 hours in a vacuum atmosphere to thereby volatilize N-methyl-2-pyrrolidone, and compressing it.

Negative active material slurries were prepared by mixing the negative active materials prepared according to Examples 1 to 3 and Comparative Example 1 with a carbon black conductive agent in an N-methylpyrrolidone solution where a polyvinylidenefluoride binder was dissolved.

The negative active material slurries were applied to copper foil having a thickness of 12 μm by using the doctor blade method. Then, negative electrodes were prepared by drying the copper foils coated with the negative active material slurries at 120° C. for 10 hours in the vacuum atmosphere to volatilize N-methyl-2-pyrrolidone, and compressing them.

Rechargeable lithium batteries were manufactured in a conventional method by using the positive electrodes, the negative electrodes, and polyolefin-based separators, e.g., polyethylene separators and polypropylene separators.

Experimental Example 2

Rechargeable lithium batteries including the negative active materials prepared according to Examples 1 to 3 and Comparative Example 1 were charged at 0.5 C up to 4.2 V and then discharged at 0.5 C down to 3.0 V. The charge/discharge was performed 50 times. Coulomb efficiencies were measured to estimate the initial reversible efficiency, and capacity retentions were measured after the charge/discharge was performed 50 times. The results were as shown in the following Table 1. The capacity retention, after performing charge/discharge 50 times, signifies a ratio of discharge capacity after 50-times charge/discharge to discharge capacity after one-time charge/discharge, which is referred to as a 50th cycle-life in Table 1.

TABLE 1

|  | Coulomb efficiency | 50th cycle-life |
|---|---|---|
| Example 1 | 92.5% | 80.8% |
| Example 2 | 91.9% | 78.3% |
| Example 3 | 92.2% | 79.1% |
| Comparative Example 1 | 91.7% | 76% |

It is shown from Table 1 that the batteries of Examples 1 to 3 had a high Coulomb efficiency and excellent cycle-life, compared to the battery of Comparative Example 1.

These results show that reactivity at the interface between a negative electrode and an electrolyte is improved during cell operation due to an inorganic oxide coating layer on the surface of the negative active material. Thereby charge and discharge efficiency and cycle-life of a rechargeable lithium battery are also improved.

The negative active material for a rechargeable lithium battery can be used along with an aqueous binder, and can provide a rechargeable lithium battery having high capacity, charge and discharge efficiency, and improved cycle-life, particularly high capacity during charging and discharging at a high rate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
   a core made of a material including a lithium-vanadium oxide that is capable of performing reversible electrochemical oxidation and reduction; and
   a coating layer disposed on the surface of the core, the coating layer completely enclosing the core, the coating layer being made of a material including an inorganic oxide, the coating layer including a plurality of particles, diameters of the particles being about 50 nm or less than 50 nm, the coating layer having a thickness of about 50 nm or less, wherein the lithium-vanadium oxide is represented by Chemical Formula I:

$$Li_xM_yV_zO_{2+d}$$ <span style="float:right">Chemical Formula I</span> wherein $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

2. The negative active material of claim 1, wherein the inorganic oxide is selected from the group consisting of silica, alumina, zirconia, titania, and mixtures thereof.

3. The negative active material of claim 1, wherein the coating layer has a thickness of about 30 nm or less.

4. The negative active material of claim 3, the coating layer has a thickness of about 5 nm to about 20 nm.

5. The negative active material of claim 1, wherein the diameters of the particles are about 30 nm or less.

6. The negative active material of claim 5, wherein the diameters of the particles are about 5 nm to about 20 nm.

7. The negative active material of claim 1, wherein the inorganic oxide is presented in an amount of 1 to 30 parts by weight based on 100 parts by weight of the material of the core.

8. The negative active material of claim 7, wherein the inorganic oxide is presented in an amount of 1 to 10 parts by weight based on 100 parts by weight of the material of the core.

9. A method for preparing a negative active material for a rechargeable lithium battery, comprising:
   preparing a dispersion solution by dispersing a lithium-vanadium oxide into a coating liquid including an inorganic oxide and a solvent;
   volatilizing the solvent from the dispersion solution; and
   heat-treating the solvent-volatilized dispersion solution, the lithium-vanadium oxide being formed into a core, the negative active material comprising:

a core made of the lithium-vanadium oxide that is capable of performing reversible electrochemical oxidation and reduction; and a coating layer disposed on the surface of the core, the coating layer completely enclosing the core, the coating layer being made of a material including the inorganic oxide, the coating layer including a plurality of particles, diameters of the particles being about 50 nm or less than 50 nm, the coating layer having a thickness of about 50 nm or less, wherein the lithium-vanadium oxide is represented by Chemical Formula I:

$$Li_xM_yV_zO_{2+d} \qquad \text{Chemical Formula I}$$

wherein $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof.

10. The method of claim 9, wherein the inorganic oxide is selected from the group consisting of silica, alumina, zirconia, titania, and mixtures thereof 11. The method of claim 9, wherein the inorganic oxide is presented in an amount of 1 to 30 parts by weight based on 100 parts by weight of a material of the core.

12. The method of claim 11, wherein the inorganic oxide is presented in an amount of 1 to 10 parts by weight based on 100 parts by weight of the material of the core.

13. The method of claim 9, wherein the solvent is one selected from the group consisting of water, methanol, ethanol, propanol, and mixtures thereof.

14. The method of claim 9, wherein the volatilizing of the solvent is preformed at 50° C. to 100° C.

15. The method of claim 9, wherein the heat-treating is performed at 300° C. to 600° C.

16. A rechargeable lithium battery comprising:
a positive electrode including a positive active material;
an electrolyte; and
a negative electrode including a negative active material, the negative active material comprising:
a core made of a material including a lithium-vanadium oxide that is capable of performing a reversible electrochemical oxidation and reduction; and
a coating layer disposed on the surface of the core, the coating layer completely enclosing the core, the coating layer being made of a material including an inorganic oxide, the coating layer including a plurality of particles, diameters of the particles being about 50 nm or less than 50 nm, the coating layer having a thickness of about 50 nm or less, wherein the lithium-vanadium oxide is represented by Chemical Formula I:

$$Li_xM_yV_zO_{2+d} \qquad \text{Chemical Formula I}$$

wherein $0.1 \leq x \leq 2.5$, $0 \leq y \leq 0.5$, $0.5 \leq z \leq 1.5$, $0 \leq d \leq 0.5$, and M is a metal selected from the group consisting of Al, Cr, Mo, Ti, W, Zr, and combinations thereof 17. The rechargeable lithium battery of claim 16, wherein the inorganic oxide is selected from the group consisting of silica, alumina, zirconia, titania, and mixtures thereof.

* * * * *